United States Patent Office 3,402,086
Patented Sept. 17, 1968

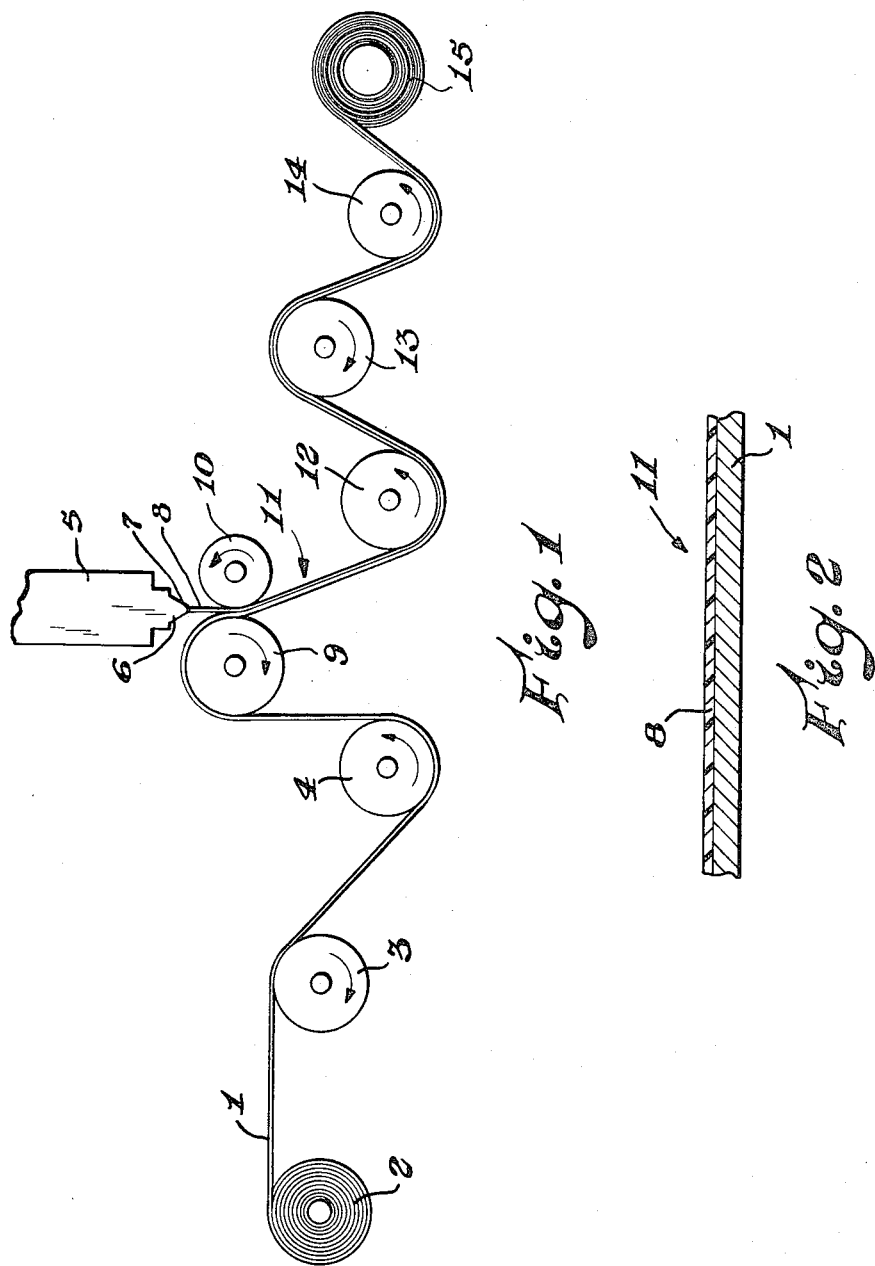

3,402,086
HOT-MELT EXTRUSION COATING PROCESS
William F. Smith, Lake Jackson, and Donald J. Endsley, Clute, Tex., assignors to The Dow Chemical Company, Midland, Mich., a corporation of Delaware
Filed June 5, 1964, Ser. No. 372,971
12 Claims. (Cl. 156—244)

ABSTRACT OF THE DISCLOSURE

A substrate is provided with an adherent coating of a random copolymer of ethylene and an $\alpha,\beta$-ethylenically unsaturated monocarboxylic acid by extruding the copolymer into the form of a film which is deposited on the substrate. The copolymer is extruded at a temperature of between about 105° and about 250° C. to prevent any appreciable degradation of the copolymer. The substrate is heated to a temperature of between about 80° and about 250° C. before, after, or both before and after the deposition of the copolymer film.

---

This invention relates to the coating art. More particularly, this invention is concerned with a process for coating substrates with ethylene/acrylic acid copolymers.

The coating of substrates with olefin polymers and copolymers has long been known to be desirable and is practiced on a large scale. Frequently, the coating is performed by the so-called hot-melt extrusion process. This type of process involves melting the olefin polymer, extruding the molten polymer through a slit-die to form a molten film of the polymer and depositing the molten film onto the substrate it is desired to coat. This process has numerous shortcomings including a low degree of adhesiveness between the polymer and the substrate. For the vast majority of applications, good adhesion of the polymer to the substrate is regarded as essential. It has been reported that improved adhesion can be obtained by operating the process at very high temperatures, e.g. 300° to 320° C. This, however, has not produced the desired degree of adhesive strength, and in addition, has introduced other problems into the process. For example, when coating substrates with ethylene/acrylic acid copolymers, the high temperatures cause a reduction in abrasion resistance, undesirable weight loss and odor due to the degradation of the copolymer. When lower temperatures are employed, e.g. 200° to 250° C., to avoid weight loss and odor effects, the copolymer layer can be easily peeled from the substrate.

It is therefore a principal object of the present invention to provide a novel coating process.

A further object of the present invention is the provision of a process for coating various metallic and non-metallic substrates with ethylene/acrylic acid copolymers.

Another object of the present invention is the provision of a process for coating metallic and non-metallic substrates with ethylene/acrylic acid copolymers whereby good adhesion is obtained between the ethylene copolymers and the substrate.

Still another object of the present invention is to provide processes of the aforementioned types which do not degrade the properties of the copolymer coating.

Other objects and advantages of the invention will be apparent from the following detailed description thereof when read in conjunction with the attached drawings in which:

FIGURE 1 schematically illustrates one method for preparing the coated substrates according to the process of the present invention.

FIGURE 2 shows a section through a film, sheet, or the like in which the substrate has been covered on one side with an ethylene/acrylic copolymer according to the process of the present invention.

The above and related objects are attained by a process which involves the hot-melt extrusion of random copolymers of ethylene and an acrylic acid at a temperature of about 105° to about 250° C. in the form of a thin molten film which is deposited upon a substrate such as sheet, film or foil which has been heated to a temperature of about 80° to about 250° C., before, after or both before and after, the ethylene copolymer is applied to the substrate.

By the term "an acrylic acid" as used throughout this specification is meant an $\alpha,\beta$-monoethylenically unsaturated monocarboxylic acid having from 3 to 7 carbon atoms. Representative specific examples of such acids are acrylic acid, methacrylic acid, ethacrylic acid, crotonic acid, isocrotonic acid, tilgic acid and angelic acid. Among these, acrylic acid itself ($CH_2=CH-COOH$) is preferred.

The copolymers employed in the process of this invention are random copolymers and can be prepared by known methods, for example, by subjecting a mixture of ethylene and an acrylic acid to high pressures such as 500 to above 1000 atmospheres and elevated temperatures in the range of 100 to 400° C. in the presence of a suitable free radical catalyst such as lauroyl peroxide, di-tertiary butyl peroxide and $\alpha,\alpha$-azobis diisobutyronitrile. Such copolymers will have molecular weights in the range of from about 600 to 100,000, and the acrylic acid will be in the copolymer in the range of from about 3 to 20 percent and preferably at about 8 percent.

The substrates which may be coated by the process of the present invention can be such non-metallic materials as wood, paper, paperboard, corrugated paper, leather, fabric, cellophane, glass, foam, plastic and the like, or metallic materials such as aluminum and steel. By the process of the present invention, polymer coatings of substantially improved adhesion to these substrates are obtained without material degradation of the physical properties of the coating.

With reference to FIGURE 1 of the drawing, there is illustrated one means by which the process of the present invention may be carried out. As shown, the substrate 1 to be coated, which may advantageously be metal foil, fabric or paper sheet, is passed from any suitable source of supply such as supply roll 2 to heating rolls 3 and 4. After being heated to a temperature between about 80° to about 250° C. by these rolls, the heated substrate 1 is next coated with molten ethylene/acrylic acid copolymer which is contained in extruder 5. The extruder 5, which may be of any conventional or desired construction, is adapted to continuously discharge the molten ethylene/acrylic acid copolymer onto the substrate surface as a relatively thin sheet 8 through an orifice 7 provided in extruder die 6. The heated substrate 1 is passed directly under and immediately adjacent to orifice 7 of die 6. It is generally advantageous to maintain the polymer in the extruder at a temperature sufficiently high to insure its remaining in a fused and molten condition after being passed from the die to the surface of the heated substrate. It is generally desirable that the molten polymer in the extruder barrel be at a temperature of about 105° to about 250° C., and as it leaves the die lips through orifice 7 to be at approximately the same temperature. These temperatures will insure that the polymer will be in the molten state upon contact with the heated substrate but such temperatures will not substantially degrade or otherwise deleteriously effect the desirable physical properties of the ethylene/acrylic acid copolymer coating.

Immediately upon being applied to the surface of the heated substrate 1, the molten copolymer is attenuated and firmly cohered to the substrate by passing the coated substrate 11 between the nip of a pair of counter-rotating pressure rolls consisting of a steel roll 9, and a roll 10 having a plastic surface of polytetrafluoroethylene, driven by any suitable means and operating in the directions indicated by the arrows. It is highly advantageous that roll 10 have a surface coating of polytetrafluoroethylene. It has been determined that the use of such a roll promotes improved coatings at higher speeds while allowing thinner coatings to be applied at lower extrusion temperatures, i.e., at temperatures substantially lower than 250° C.

After being pressed in place, the coated substrate 11 is cooled and solidified by the action of steel chill rolls 12 and 13 which are maintained at a temperature below the tack point of the polymer, which temperature is usually in the range of about 0° to about 70° C.

Optionally, chill roll 13 may be substituted with a steel heating roll. It has been determined that a subsequent heat treatment of the coated substrate at a temperature of about 80° to about 250° C. promotes even greater adhesion of the polymer coating to the substrate, and further reduces deterioration of the coating, such post heating is beneficial irrespective of whether the substrate has been initially preheated prior to the application of the ethylene copolymer layer to the substrate.

After being cooled and solidified, the coated product which is now at essentially room temperature, may be taken up for subsequent use by any suitable means or in any desired manner, such as being tensioned under guide roll 14 and fed to take-up roll 15 onto which the coated product is shown being wound in FIGURE 1 of the drawing. Of course, if desired, it can be directly passed, without intermediate take-up to any subsequent manufacturing operation in which it may be employed.

Under actual conditions, the orifice 7, of die 6, may be approximately 20 to 30 mils wide and spaced from roll 9 to the tangent point at a distance of 1 to 6 inches, with extrusion rates and coating rates sufficient to provide a coating having a thickness of 1 mil, although it is to be understood that the coating on coated substrate 11 may vary in thickness from 0.25 mil to 10 mils or more depending upon the protective properties demanded of the final product as well as the preferred cost thereof.

FIGURE 2 schematically illustrates a cross-sectional view of the coated structure 11 prepared by the process illustrated in FIGURE 1 wherein an ethylene/acrylic acid coating 8 is firmly adhered to a suitable substrate 1.

In the hot-melt extrusion process of this invention, there can be also included in the melt minor amounts of materials such as dyes, pigments, stabilizers, lubricants, resins other than the ethylene/acrylic acid copolymer, fillers, and so forth.

The invention is illustrated more particularly by way of the following examples but, as will be apparent, is not limited to the details thereof.

EXAMPLE 1

Aluminum foil having a width of 16 inches and a thickness of 8 mils was fed from a supply roll and preheated to 175° C. by passing the foil over a pair of heated rolls as illustrated in FIGURE 1. The preheated foil was run at a linear rate of 50 feet per minute under a knife-shaped extruder die which applied a molten ethylene/acrylic acid copolymer at a temperature of 218° C. from the die lips to the surface of the preheated foil.

The ethylene/acrylic acid copolymer employed for the coating operation contained 9.1 percent acrylic acid and had a melt index of 3.58 decig./min.

The copolymer coated foil was fed to the nip of a pair of rolls, consisting of an 8 inch diameter steel back-up roll and a 2.25 inch diameter polytetrafluoroethylene coated pressure roll, by which the molten copolymer was pressed and laminated into place. The coated foil was then cooled by passing the foil over a pair of steel 8 inch diameter chill rolls operated at a temperature of about 65° C. After being cooled, the resultant coated foil having a tightly bonded 2 mil layer of the ethylene/acrylic acid copolymer was taken up onto a storage roll.

The ethylene/acrylic acid copolymer coated aluminum foil had an adhesion rating of 4 lbs./in. when measured by the Perkins-Southwich adhesion test according to TAPPI procedures.

By way of contrast when the same aluminum foil was coated in the same manner as described above, excepting to eliminate preheating of the aluminum foil, the coating had an adhesion rating of 2.85 lbs./in. Increasing the extrusion temperature to temperatures in the range of 300° to 320° C. so as to improve the adhesion of the copolymer, caused an undesirable loss of abrasive resistance and degradation of the copolymer along with formation of a highly undesirable odor.

EXAMPLE 2

Forty pound per ream bleached kraft paper sheet having a width of 16 inches was fed from a supply roll and preheated to 120° C. by passing the paper sheet over a pair of heated rolls as illustrated in FIGURE 1. The preheated paper sheet was run at a linear rate of 50 feet per minute under a knife shaped extruder die which applied a molten ethylene/acrylic acid copolymer at a temperature of 260° C. from the die lips to the surface of the preheated paper sheet.

The ethylene/acrylic acid copolymer employed for the coating operation contained 11.9 percent acrylic acid and had a melt index of 4.2 decig./min.

The copolymer coated paper was fed to the nip of a pair of rolls, consisting of an 8 inch diameter steel back-up roll and a 2.25 inch diameter polytetrafluoroethylene coated pressure roll, by which the molten copolymer was pressed and laminated into place. The coated foil was then cooled by passing the foil over a pair of steel 8 inch diameter chill rolls operated at a temperature below the tack point of the copolymer, i.e. about 65° C. After being cooled, the resultant coated paper sheet having a tightly bonded 0.75 mil layer of the ethylene/acrylic acid copolymer was taken up onto a storage roll.

The ethylene/acrylic acid copolymer coated paper sheet had a burst strength of 28.8 p.s.i. when measured by the Perkins-Southwich Bond Tester according to TAPPI procedures.

By way of contrast, when the same paper substrate was coated in the same manner as described above, excepting to eliminate preheating of the paper substrate, the coating had a burst strength of 25.0 p.s.i.

EXAMPLE 3

Following the procedure of Example 1, an aluminum foil having a thickness of 8 mils was preheated to 148° C. After being coated with an ethylene/acrylic acid copolymer containing 11.9 percent acrylic acid having a melt index of 4.2 decig./min., strips of the coated aluminum foil were post-heated in an oven at 250° C. for varying time periods as shown in Table I.

The strips were then placed in boiling xylene for one hour to determine the effect of this post heating treatment on the amount of soluble polymeric degradation products produced during the coating operation. The data in Table I below indicate that heating the coated aluminum foil, after the coating has been applied, substantially reduces the polymeric degradation products formed; the reduction, at a given temperature being proportional to the time of heating.

Table I

| Post heating time @ 250° C. (minutes) | Polymer weight loss (mg.) |
|---|---|
| 0 | 161.7 |
| 1 | 81.5 |
| 2 | 36.4 |
| 10 | 3.7 |

EXAMPLE 4

Following the procedure of Example 1, a 7 mil thick aluminum foil was coated with a 0.7 mil coating of an ethylene/acrylic acid copolymer containing 4 percent acrylic acid having a melt index of 6.7 decig./min. at the rate of 75 ft./min. The aluminum foil, however, was not preheated. The temperature of the molten copolymer at the time of extrusion from the die lips was 273° C. Strips of the coated aluminum foil were post heated in an oven at 250° C. for varying time periods as indicated in Table II below.

Strips of the coated aluminum foil were placed in boiling xylene for one hour to determine the amount of soluble polymeric degradation products produced during the coating operation. The data in Table II below indicate that heating the coated aluminum foil after the coating has been applied, substantially reduces solubility loss, the reduction at a given temperature being proportional to the time of heating.

Table II

| Post heating time @ 250° C. (minutes) | Percent polymer loss after boiling in xylene |
|---|---|
| 1 | 92.7 |
| 2 | 65.7 |
| 10 | 56.2 |

By way of contrast, aluminum foil coated in the same manner with the same ethylene/acrylic acid copolymer without benefit of either preheat or post heat had a polymer loss of 99.9 percent when boiled in xylene for one hour.

EXAMPLE 5

Following the procedure of Example 1, an aluminum foil having a thickness of 8 mils was preheated to 160° C. The foil was coated with an ethylene/acrylic acid copolymer containing 11.9 percent acrylic acid and having a melt index of 4.2 decig./min. The temperature of the molten copolymer extruded from the die lips was 218° C.

The aluminum sheet was coated with a 2.5 mil coating of copolymer which was subsequently post heated at 250° C. The coated sheet was tested to determine its abrasion and scratch resistance.

The abrasive resistance was determined by a standard Taber abrasive tester with 1000 gram weights on the tester. Pinholing was checked, by cupric sulfate every 25 revolutions of the abrader. Two coated sheets were run in duplicate and 1200 revolutions on the tester were made in each case before pinholing occurred in the copolymer coating.

Scratch resistance was determined with a Hoffman hardness tester. A strip of the ethylene/acrylic acid copolymer coated aluminum foil was subjected to the test and it required 5 grams to break through the coating.

By way of contrast, aluminum foil coated with the same ethylene/acrylic acid copolymer in the same manner which had not been either preheated or post heated required only 4 grams pressure to break through the coating.

In a manner similar to Example 5, any of the metallic substrates such as iron, steel, tin and the like and non-metallic substrates mentioned above may be coated with ethylene/acrylic acid copolymers to form coated substrates having tightly adhering coatings.

What is claimed is:

1. A process for coating substrates which comprises the steps of
    (a) heating the substrate to a temperature of about 80° to about 250° C.,
    (b) extruding a molten random copolymer of ethylene containing 3 percent by weight to about 20 percent by weight of an $\alpha,\beta$-ethylenically unsaturated monocarboxylic acid having from 3 to 7 carbon atoms into the form of a thin molten film, said extrusion being conducted at a temperature of between about 105° and about 250° C. to avoid appreciable degradation of the copolymer, and depositing said molten film on said substrate and then
    (c) cooling said applied copolymer layer to a normal temperature to solidify same on said substrate and form a tightly adhering copolymer layer on said substrate.

2. The process of claim 1 wherein the ethylene copolymer contains 4 to 15 percent by weight of the $\alpha,\beta$-ethylenically unsaturated monocarboxylic acid.

3. The process of claim 1 wherein the $\alpha,\beta$-ethylenically unsaturated monocarboxylic component of the ethylene copolymer is acrylic acid.

4. The process of claim 1 wherein the coated substrate is heated to a temperature of about 80° to about 250° C. after the substrate is coated with the ethylene copolymer.

5. The process of claim 1 wherein the coated substrate is metallic.

6. The process of claim 1 wherein the coated substrate is aluminum.

7. The process of claim 1 wherein the coated substrate is non-metallic.

8. The process of claim 1 wherein the coated substrate is paper.

9. A process for coating substrates which comprises the steps of
    (a) extruding a molten random copolymer of ethylene containing 3 percent by weight to about 20 percent by weight of an $\alpha,\beta$-ethylenically unsaturated monocarboxylic acid having from 3 to 7 carbon atoms into the form of a thin molten film, said extrusion being conducted at a temperature of between about 105° and about 250° C. to avoid appreciable degradation of the copolymer, and depositing said molten film on said substrate,
    (b) cooling said applied copolymer layer to a normal temperature to solidify same on said substrate and form a tightly adhering copolymer layer on said substrate and then subsequently
    (c) heating said coated copolymer containing substrate to a temperature of about 80° to about 250° C.

10. The process of claim 9 wherein the $\alpha,\beta$-ethylenically unsaturated monocarboxylic acid component of the ethylene copolymer is acrylic acid.

11. The process of claim 9 wherein the coated substrate is metallic.

12. The process of claim 9 wherein the coated substrate is aluminum.

References Cited

UNITED STATES PATENTS

| 2,714,571 | 8/1955 | Irion et al. | 156—244 |
| 3,132,246 | 5/1964 | Mosher et al. | 250—49.5 |
| 3,239,370 | 3/1966 | Thomson et al. | 161—250 X |
| 3,270,090 | 8/1966 | Nowak | 161—216 X |
| 3,323,965 | 6/1967 | Hanle et al. | 156—244 |

EARL M. BERGERT, *Primary Examiner.*

T. R. SAVOIE, *Assistant Examiner.*

Disclaimer 3,402,086.—*William F. Smith*, Lake Jackson, and *Donald J. Endsley*, Clute, Tex. HOT-MELT EXTRUSION COATING PROCESS. Patent dated Sept. 17, 1968. Disclaimer filed Oct. 3, 1977, by the assignee, *The Dow Chemical Company*.

Hereby enters this disclaimer to claims 1, 2, 3, 5 and 6 of said patent.

[*Official Gazette October 21, 1980.*]